United States Patent [19]

Seiler

[11] 4,336,792
[45] Jun. 29, 1982

[54] SOLAR HEATING FREEZE PROTECTION SYSTEM

[75] Inventor: Edwin N. Seiler, Berkeley Heights, N.J.

[73] Assignee: Bell Telephone Laboratories, Incorporated, Murray Hill, N.J.

[21] Appl. No.: 182,668

[22] Filed: Aug. 29, 1980

[51] Int. Cl.³ .............................................. F24J 3/02
[52] U.S. Cl. ................................. 126/420; 126/422; 237/80; 137/59
[58] Field of Search ............... 126/420, 422, 421, 400; 237/66, 80; 137/59, 60, 61; 138/27; 165/71

[56] References Cited

U.S. PATENT DOCUMENTS

| | | |
|---|---|---|
| 2,838,043 | 6/1958 | Buss, Jr. . |
| 3,986,489 | 10/1976 | Schlesinger . |
| 4,010,734 | 3/1977 | Chayett . |
| 4,027,821 | 6/1977 | Hayes et al. .................... 126/400 |
| 4,119,086 | 10/1978 | Brussels . |
| 4,119,087 | 10/1978 | Cook . |
| 4,122,830 | 10/1978 | Hapgood . |
| 4,138,996 | 2/1979 | Cartland . |
| 4,207,866 | 6/1980 | Boyd ................................ 126/434 |
| 4,269,167 | 5/1981 | Embree ............................ 126/420 |

FOREIGN PATENT DOCUMENTS 696246  4/1978  U.S.S.R. .............................. 126/420

Primary Examiner—Samuel Scott
Assistant Examiner—Randall L. Green
Attorney, Agent, or Firm—H. W. Lockhart

[57] ABSTRACT

A solar energy system for heating water is disclosed. The system comprises a closed piping circuit in which water is pumped through a heat exchanger and storage tank which are not exposed to freezing temperatures up through a solar collector which may be so exposed. Protection against damage from freezing is provided by enabling drain-back of the water from exposed portions of the system and replacement with air when there is no water circulation.

When water is circulating, a surge pipe bypassing the storage tank provides unimpeded flow of the full volume of water while extracting entrained air which is conveyed to the storage tank. Thus, solar-heated water does not flow through and is not stored in the storage tank during operation of the system, and the cost and inconvenience of insulating the storage tank in order to inhibit large energy loss is avoided.

4 Claims, 2 Drawing Figures

SOLAR HEATING FREEZE PROTECTION SYSTEM

BACKGROUND OF THE INVENTION

This invention relates to solar energy heating systems and more particularly to a system using water as the heat collection and transfer medium.

One of the primary problems of solar energy systems which uses water is damage caused by freezing of the water in exposed portions of the system. One solution to this problem is to circulate warmed water through exposed portions of the system during periods when no solar radiation is available. This, however, uses energy which otherwise is wasted.

Another widely used arrangement for meeting the freeze damage problem is the drain-back system in which the water in the exposed portions of the system is replaced with air during periods when solar radiation is not available. This requires sufficient protected storage capacity in the system to accommodate the necessary volume of air during solar operation, or the drain-back water volume during shut-down. However, such a storage facility is serially connected in the system so that during operation the water heated by solar radiation is circulated therethrough, and, to some extent, held therein. Accordingly, extensive insulation of the storage facility is required to reduce loss of heat. This is both costly and inconvenient.

SUMMARY OF THE INVENTION

In accordance with this invention, a solar energy system for heating water of the type having a drain-back arrangement for freeze protection includes a surge pipe bypassing the storage facility which is adapted to pass the full operating volume flow of water while extracting and conveying the entrained air to the storage facility. Thus, the storage facility is not a part of the solar-heated water circuit during operation, and therefore insulation of the storage facility to prevent energy loss is unnecessary.

Accordingly, a feature of the invention is a storage facility in a solar energy heating system of the drain-back type which is not insulated.

BRIEF DESCRIPTION OF THE DRAWING

The invention and its objects and other features will be more clearly understood from the following description taken in conjunction with the drawing in which.

DETAILED DESCRIPTION

Figure 1:
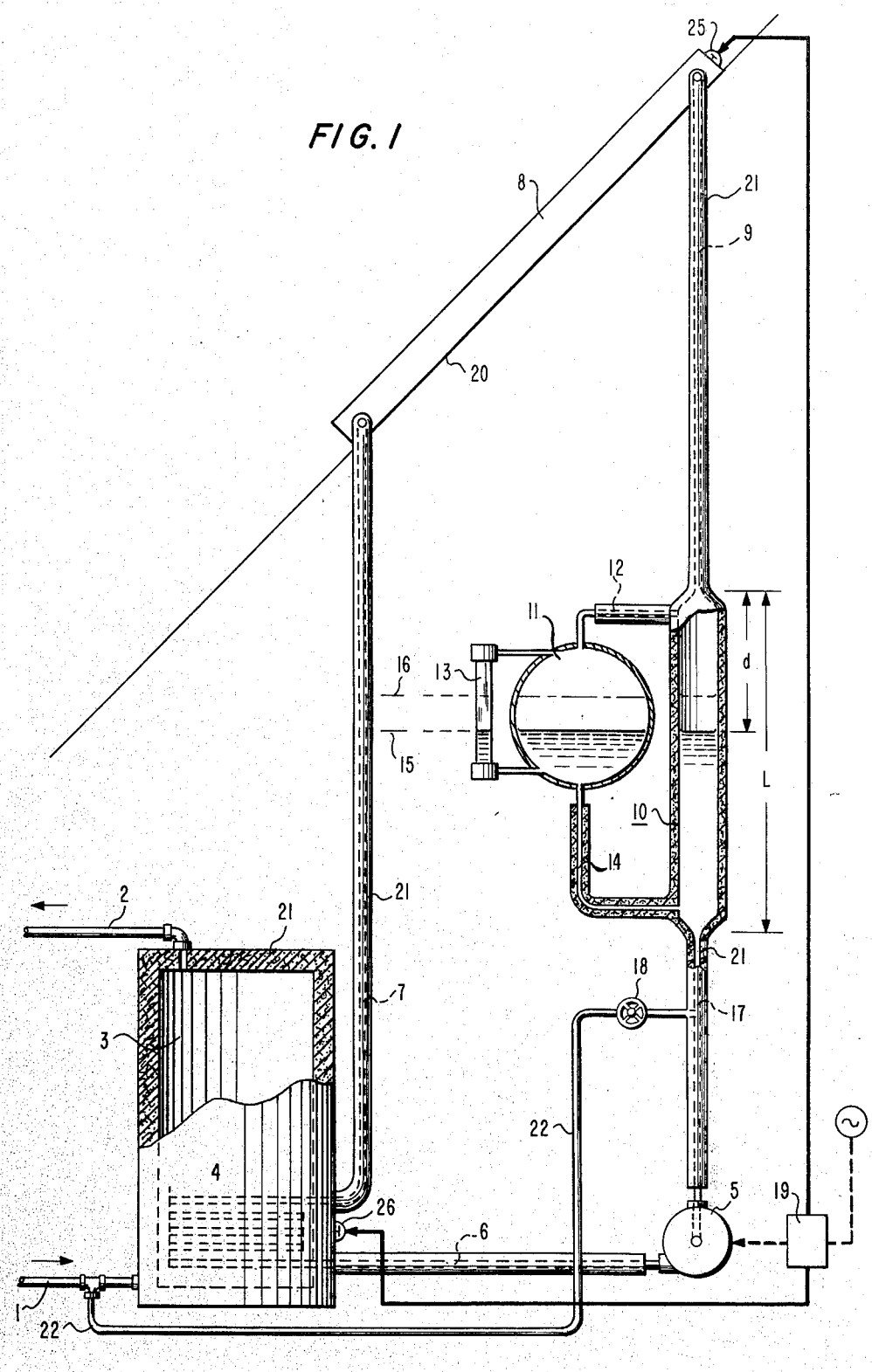
FIG. 1 is a schematic diagram partially in section of an embodiment of a solar energy system for heating water in accordance with this invention.

FIG. 1 is a schematic diagram of a solar energy system for heating a domestic water supply for a residence or a commercial establishment, the domestic water supply is held in an insulated tank 3 having an inlet pipe 1 and an outlet pipe 2. The water within this tank is heated by hot water from the solar energy heating system circulating through a pipe coil 4 or similar heating exchanger submerged within the tank. Alternatively, the water from tank 3 may be used for space heating or for other uses.

Water within the solar energy heating system is heated by solar radiation impinging on an exposed solar collector 8 suitably mounted in an exposed location. The line 20 represents a roof line on which collector 8 is mounted.

Within the building, the solar heating system comprises a circulating pump 5 which is of the nonpressure or holding type through which reverse flow may occur when the pump is not operating. Pipeline 7 is the cold water return to the solar collector 8. Pipelines 9 and 17 are the hot water return from the solar collector. The closed solar water circulating system further includes storage tank 11 and parallel-connected bypass surge pipe 10. The storage tank 11 is a reservoir for water and air to enable the drain-back of water from the exposed portions of the system and replacement thereof with air. A pipeline 22 with stop valve 18 is a means for filling and providing makeup water for the closed circulating system from a suitable water source.

The enlarged pipe section 10 is the surge pipe bypass in parallel with the storage tank 11. Pipeline 12 connects from the upper end of the bypass surge pipe to the top of the storage tank 11, and pipe 14 connects from the lower end to the bottom of the storage tank. For convenience, the storage tank may be fitted with a sight-glass 13 for observing the water level in the storage tank.

Control box 19 houses an electrical control system for controlling the operation of pump 5, dependent upon the water temperature sensed at the outlet 25 of the solar collector 8 and the water temperature at point 26 near the bottom of the domestic water supply tank 3. As shown in section by the layer 21, the water circulation system of the solar energy heating system, except for the solar collector 8 and the storage tank 11, is suitably insulated to minimize the loss of heat therefrom. The domestic water supply tank 3 also may be insulated.

Ordinarily, the storage facility, in this case tank 11, included in drain-back type systems is serially connected in the hot water circuit and when operating in the solar collection mode, the full volume of solar-heated water passes therethrough. In such case, the storage tank must, of necessity, be well insulated to inhibit a considerable energy loss. In accordance with this invention, the bypass surge pipe 10 connected in parallel with the storage tank 11 has a sufficient cross-sectional area in relation to the volume of water flowing in the system, as well as the velocity thereof, so that the air entrained in the circulating solar-heated water is extracted and carried largely through upper connecting line 12 to the upper portion of the storage tank 11. More particularly, the bypass surge pipe 10 is sized so that during normal operation of the solar heating system, there is no flow of solar-heated water through the storage tank 11. Consequently, it is unnecessary to provide insulation for the storage tank 11.

Figure 2:
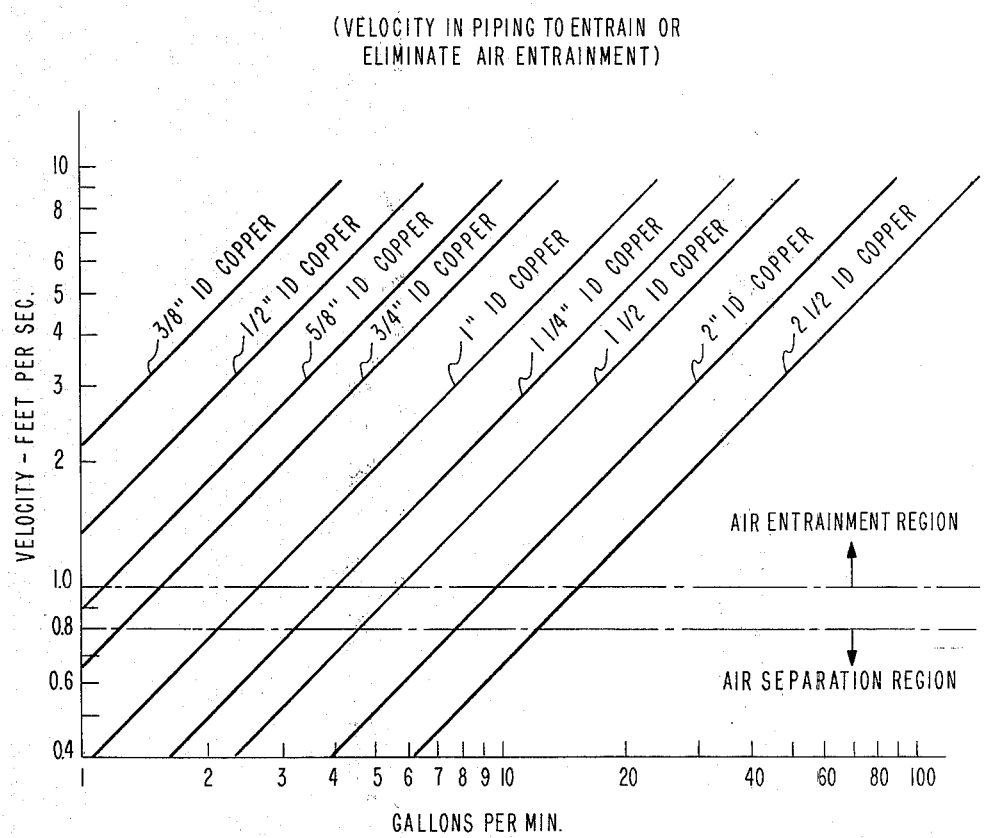
FIG. 2 is a graph for use in selecting a suitable size pipe, both for the circulating portion of the system of FIG. 1 and for selecting the size of the bypass surge pipe.

The size of the bypass surge pipe 10 may be determined using the graph of FIG. 2. The graph is a plot of various inside diameter pipe sizes against volume and velocity of water flow. The region from a velocity of about 1 foot per second and above is characterized as that in which air will remain entrained in the flowing water. In effect, this is a region of turbulent flow. The region from about 0.4 to 0.8 feet per second defines conditions in which air will separate out of flowing water almost completely and may be characterized as a nonturbulent flow region. Thus, entering the graph with the design parameters of volume flow and velocity, the optimum pipe size may be selected both for the pipeline portions 7, 9, and 17, in which the circulating water contains entrained air and for the bypass surge pipe 10 in which air separation occurs. Generally, cost is minimized by selecting the smallest suitable pipe size. Generally, the bypass surge pipe has a length double, at least, to the greatest cross-sectional dimension of the storage means.

In another aspect, the length of the bypass surge pipe 10 should be sufficient to sustain a water column which will absorb the energy and turbulence of water falling from the inlet to the water surface. Alternatives may be adopted to dissipate the energy of this entering water, such as by using a spray type of inlet or other means of introducing the water quiescently. However, care must be taken that air is not aspirated or educted from the storage tank 11 by such means.

In the system described in FIG. 1 using no special means for introducing the water into the surge pipe 10, the total length, L, of the surge pipe 10 is about three times the distance, d, from the inlet to the normal operating water level 15.

In the operation of the system of FIG. 1, the solar hot water circuit is filled initially with water to a particular level, indicated by the line 16. When the system then is placed in operation with solar radiation impinging on the solar collector 8 and with the pump 5 circulating water through the system, some of the air originally in the closed system will be entrained in the circulating water, and some will comprise the upper volume of the storage tank 11. With the system in operation, the water level will drop typically to a level that is indicated by the line 15. The volume of water represented by the difference between level 15 and level 16 in the storage tank 11, bypass surge pipe 10, and pipeline 7 will equal the volume of water held by the closed solar hot water system above the elevation 16. A reduction or cessation of solar radiation will result in a drop in water temperature at the outlet of collector 8 at point 25. If this temperature is less than the water temperature at point 26 in the water supply tank 3, the control 19 will cut off power to the pump 5, and circulation in the solar water heating system will stop. When circulation stops, the column of water in the cold water supply pipe 7 is greater than the water column above the level 15 in hot water outlet pipe 9, and a syphon is established which moves water in the reverse direction throughout the solar water system. The water will rise to the original level 16 throughout the system, including the storage tank 11, and the system above level 16 will contain air. Thus, drain-back of the water in the exposed portions of the system occurs, and the danger of damage from freezing is avoided.

In a particular embodiment, the circulating pump 5 has a capacity of 3 gallons per minute against a static head of 22 feet of water column but as used in this application, is operated at 1 gallon per minute. The solar heating pipe circuit, including the cold water return 7 and hot water outlet pipes 9 and 17, has an internal diameter of 0.569 inches and conveyed water with entrained air at a velocity of 1.4 feet per second. Bypass surge pipe 10 has an internal diameter of 1.29 inches and provides complete separation of air at a water velocity of 0.4 feet per second. Further, in this particular embodiment, the storage tank 11 has a capacity of 15 gallons and is of cylindrical shape, having a diameter of 12 inches. Bypass surge pipe 10 has a total length of about 24 inches, and pipe 12 is connected 6 inches above water level 15, whereas pipe 14 is connected at the lower end of surge pipe 10. In an alternate arrangement, advantage may be obtained by providing the bypass surge pipe in an L-shape section, with the foot portion extending beneath the storage tank 11 and the pipe 17 being connected near the end of the foot of the L section. A short pipe connection then is made from the top of the L section to the bottom of the storage tank. The L-shape pipe has the same diameter as the straight bypass surge pipe, and the horizontal length is not less than about 8 diameters in length.

I claim:

1. A solar energy system for heating water comprising a closed piping system including an elevated solar collector exposed to solar radiation and to freezing temperatures, storage means protected from freezing temperatures, pump means for circulating water in the system, said system containing both air and water and being arranged to permit drain-back of water from the collector and replacement thereof with air when the circulating means is not operating, characterized in that bypass means parallel the storage means, the bypass means enabling flow therethrough of the full volume of water circulated in the system and enabling substantially complete separation of air entrained in the water for accumulation in the storage means, whereby substantially no water flows through the storage means during operation.

2. The solar energy system for heating water in accordance with claim 1 characterized in that the bypass means comprises a surge pipe having an internal diameter and length which enables nonturbulent flow of the water circulating in the closed system.

3. A solar energy system for heating water in accordance with claim 1 in which said storage means comprises a storage tank characterized further in that the bypass means comprises a surge pipe having an internal diameter which enables nonturbulent flow of the water circulating in the closed system, the surge pipe having a connection at one end to a location near the top of the storage tank and a second connection from the other end to a location near the bottom of the storage tank.

4. A solar energy system for heating water in accordance with claim 3 in which the storage tank has a maximum vertical cross-sectional dimension characterized in that the surge pipe has a total length about twice the maximum vertical cross-sectional dimension of the storage tank.

* * * * *